2 Sheets—Sheet 2.

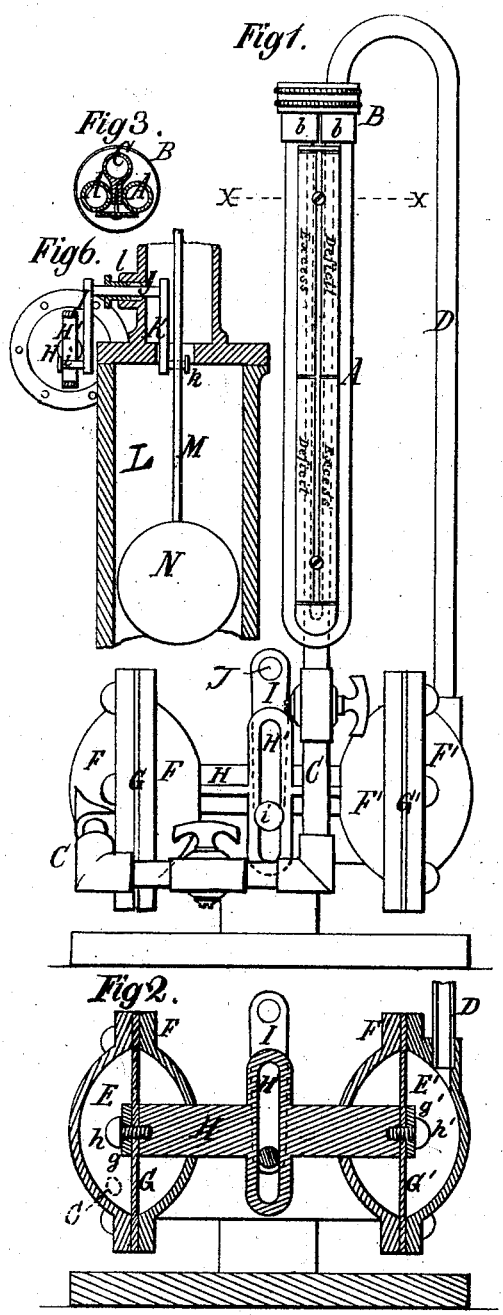

S. WHEELER
INDICATOR FOR BOILERS &c.

No. 184,275. Patented Nov. 14, 1876.

Witnesses:

Inventor:

UNITED STATES PATENT OFFICE.

SETH WHEELER, OF ALBANY, NEW YORK.

IMPROVEMENT IN INDICATORS FOR BOILERS, &c.

Specification forming part of Letters Patent No. 184,275, dated November 14, 1876; application filed March 24, 1876.

*To all whom it may concern:*

Be it known that I, SETH WHEELER, of Albany, in the county of Albany and State of New York, have invented a new and useful Improvement in Indicators for Boilers and other purposes, which improvement is fully set forth in the following specification, reference being had to the accompanying drawings, in which—

Figure 7:
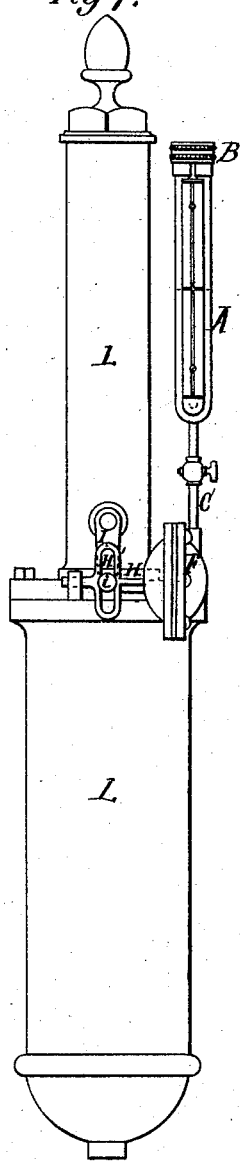

Figure 1 is a front view of one of my indicators for a boiler. Fig. 2 is a vertical section of a portion of the intermediate parts between the boiler front and the indicator proper. Fig. 3 is a horizontal section of the indicator proper in the line $x\ x$ of Fig. 1. Fig. 4 is a rear elevation of a portion of the indicating apparatus as applied to a float-chamber of a steam-boiler. Fig. 5 is a vertical section through a float-chamber of a boiler. Fig. 6 is a section at right angles to Fig. 5 through said float-chamber. Fig. 7 is a front elevation of a modification of the indicator proper, showing one air-chamber and diaphragm. Fig. 8 represents a modification of the indicator-pipe.

The nature of my invention consists, first, in an indicating apparatus in which a body of water is confined and supported in a tube and arranged to be acted upon by a column of compressed air, such air being compressed or set in motion, and caused to act upon one side of said water by either a moving diaphragm or piston, or its equivalent, set in motion by a float, or its equivalent, and the elevation of the body of supported water, causing it to serve as an indicator upon a scale, and thereby indicate the height of the water in a boiler or other vessel.

It consists, secondly, in an air-chamber or cylinder, having a diaphragm or piston, or its equivalent, operated by a reciprocating yoke or link, which is adapted to be moved by a float, or its equivalent, in combination with a transparent indicator-tube of U or other suitable form, in which water is confined and supported, this combination being such that when the yoke or link is moved (by reason, for instance, of the falling of water in a boiler) the air in the chamber is compressed, and thereby caused to move the water in the indicator-pipe opposite figures or marks on an index-plate, which marks or figures indicate low or high water.

It consists, thirdly, in a transparent indicator-pipe, partly filled with water, and having each of its ends connected with an air-chamber or cylinder, in which is a diaphragm, piston, or its equivalent, receiving its motion from a reciprocating yoke or link, said yoke or link being adapted to be operated by a float, so that the motions of the diaphragms cause an alternate compression and expansion of the air between them and the water in the indicator-pipe, thereby changing the position of the said water, and causing it to serve as means for indicating high or low water in a boiler or other vessel.

To enable others skilled in the art to understand my invention, I will proceed to describe it.

In the accompanying drawings, A represents a U-shaped glass or transparent pipe, the upper ends of which are inserted into sockets $b$ of a metal head, B. The said head B has a pipe, C, communicating with one arm of the pipe A, and a pipe, D, communicating with the other arm of the said pipe A. The pipe C communicates at the other end with a chamber, E, formed partly by a spheroidal vessel, F, and partly by a flexible diaphragm, G, fastened between the two halves of the said vessel F, as seen in Fig. 2. The pipe D communicates with a chamber, E', in a spheroidal vessel, F', having a diaphragm, G'. The said diaphragms G G' are fastened at their centers by means of washers $g\ g'$ and screws $h\ h'$ to the ends of a connecting-link, yoke, or rod, H, which is provided with a vertical slot, H'. In the slot H' a pin, $i$, of a crank-lever, I, may be fitted to move freely, the said crank-lever I being by means of a rock-shaft, J, connected with a lever, K, inside a float-chamber, L, of a boiler. The shaft J is to be passed through the wall of the float-chamber and provided with a stuffing-box, $l$. The lever K may have a pin, $k$, which fits and slides in an inclined slot, $m$, of a float-shank, M, to which a float, N, is to be attached. The float N may be of the usual construction, and its shank M guided by a bridge, l', in the float-chamber, so that it cannot yield to the resistance offered by the diaphragms to the movement of the levers.

In ordinary cases the use of one diaphragm is sufficient, and the pipe D is removed, leaving that end of the arm of the indicator-pipe A which was connected with said pipe open and exposed to the influence of the surrounding atmosphere. The second diaphragm may then, also, be omitted, and the indicator would present the appearance of Fig. 7.

Operation: When, by the falling of the water in a boiler, the float sinks, the inclined slot m of its shank M moves the crank-arm I to one side, thereby causing the rod H to be moved in the same direction, and the diaphragm G of the chamber E to force the air therein before it. This action of the diaphragm compresses the air slightly against the surface of the water, inside the indicator-pipe A, and thereby causes it to change its position and indicate on the index-plate the condition of the water in the boiler.

In case the indicator-pipe A is very far from the diaphragm, and the pipe C passes through rooms of different and changeable temperature, and when the effects of such changes upon the air inside the said pipe interfere greatly with the reliability of the indicator, a second diaphragm is so connected with the first diaphragm that the two diaphragms shall work together with reversed action, viz., when one compresses the air within, the other expands it. This combination of diaphragms connected by the pipes C and D with the indicator, causes the water in the pipe to be moved on one side by compressed air, and on the other by expanded air, and vice versa; and thus it is easily seen that any change of temperature around the two pipes will have the same effect upon the air in both pipes, and will consequently not interfere with the reliability of the indicator.

Figure 9:
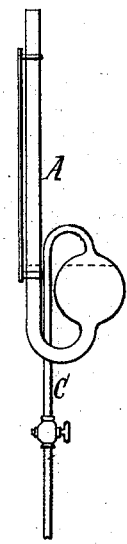

Instead of making the indicator-pipe A of U shape, it may be made of the shape represented in Fig. 9, where a globe reservoir serves as substitute for the second arm, the connections and the operation in this case being the same as hereinbefore specified.

In carrying out my invention as an indicator for boilers, I contemplate employing a solid float held in balance or partial balance. I also contemplate substituting the diaphragm by a small cistern filled with water or other fluid and moved by the float, and into which fluid the pipe C is inserted, the variable surface of the said liquids operating the indicator. I further contemplate to employ a small stationary cistern filled with a proper liquid, into which the pipe C of the indicator is inserted, the said indicator participating in the movements of a float, and thereby diminishing or increasing its distance from the surface of the liquid contained in the said cistern.

Having thus described my invention, what I claim, and desire to secure by Letters Patent, is—

1. A transparently inclosed movable body of water or other liquid acted upon by a movable column of air, said air column being set in motion either by a reciprocating diaphragm or piston having connection with a float, or its equivalent, substantially as and for the purpose set forth.

2. The combination of the indicator-pipe A, the pipe C, the vessel F, diaphragm G, or equivalent, and the rod H, adapted to be operated through a float or by the rise or fall of water in a boiler or other vessel, substantially as and for the purpose set forth.

3. The transparent indicator-pipe A, filled partly with water or other fluid, in combination with the pipes C and D, the air-chambers E E', the diaphragms G G', or equivalents, and the rod H, adapted to be operated by the movements of a float, or its equivalent, substantially as and for the purpose set forth.

SETH WHEELER.

Witnesses:
JOHN T. WHEELER,
E. WACKERHAGEN.